(12) United States Patent
Ogura

(10) Patent No.: US 7,031,042 B2
(45) Date of Patent: Apr. 18, 2006

(54) SIGNAL CONVERTER FOR CONVERTING DIGITAL INPUT SIGNAL TO OPTICAL MODULATION SIGNAL

(75) Inventor: Masaki Ogura, Tokyo (JP)

(73) Assignee: Hitachi Cable, Ltd., Tokyo (JP)

(*) Notice: Subject to any disclaimer, the term of this patent is extended or adjusted under 35 U.S.C. 154(b) by 0 days.

(21) Appl. No.: 10/825,586

(22) Filed: Apr. 16, 2004

(65) Prior Publication Data

US 2005/0068600 A1    Mar. 31, 2005

(30) Foreign Application Priority Data

Jun. 9, 2003    (JP) .............................. 2003-163661

(51) Int. Cl.
*G02B 26/00* (2006.01)
(52) U.S. Cl. ..................................... 359/238; 341/137
(58) Field of Classification Search ................ 359/238, 359/239, 245, 276; 347/137; 385/2, 3, 14, 385/8–10; 398/176, 177, 180, 195, 198; 372/25, 26, 38, 38.01, 38.02, 29.011, 31, 372/32; 341/137
See application file for complete search history.

(56) References Cited

U.S. PATENT DOCUMENTS 6,539,038 B1 *    3/2003    Wilkerson et al. ........ 372/38.02

FOREIGN PATENT DOCUMENTS

JP              2642499          5/1997

* cited by examiner

*Primary Examiner*—Hung Xuan Dong
*Assistant Examiner*—Joseph Martinez
(74) *Attorney, Agent, or Firm*—McGinn IP Law Group PLLC

(57) ABSTRACT

A signal converter for converting a digital input signal to an optical modulation signal includes a pilot signal-superimposing circuit which superimposes a pilot signal on a bias control signal, a monitor circuit for providing a monitor signal by receiving a part of the optical modulation signal supplied from the optical modulator, a first feedback system for providing an amplitude control signal to control an amplitude of the digital input signal through a frequency deviation signal obtained from the monitor signal, and a second feedback system for providing the bias control the bias signal through a multiplying frequency deviation signal obtained from the monitor signal.

14 Claims, 10 Drawing Sheets

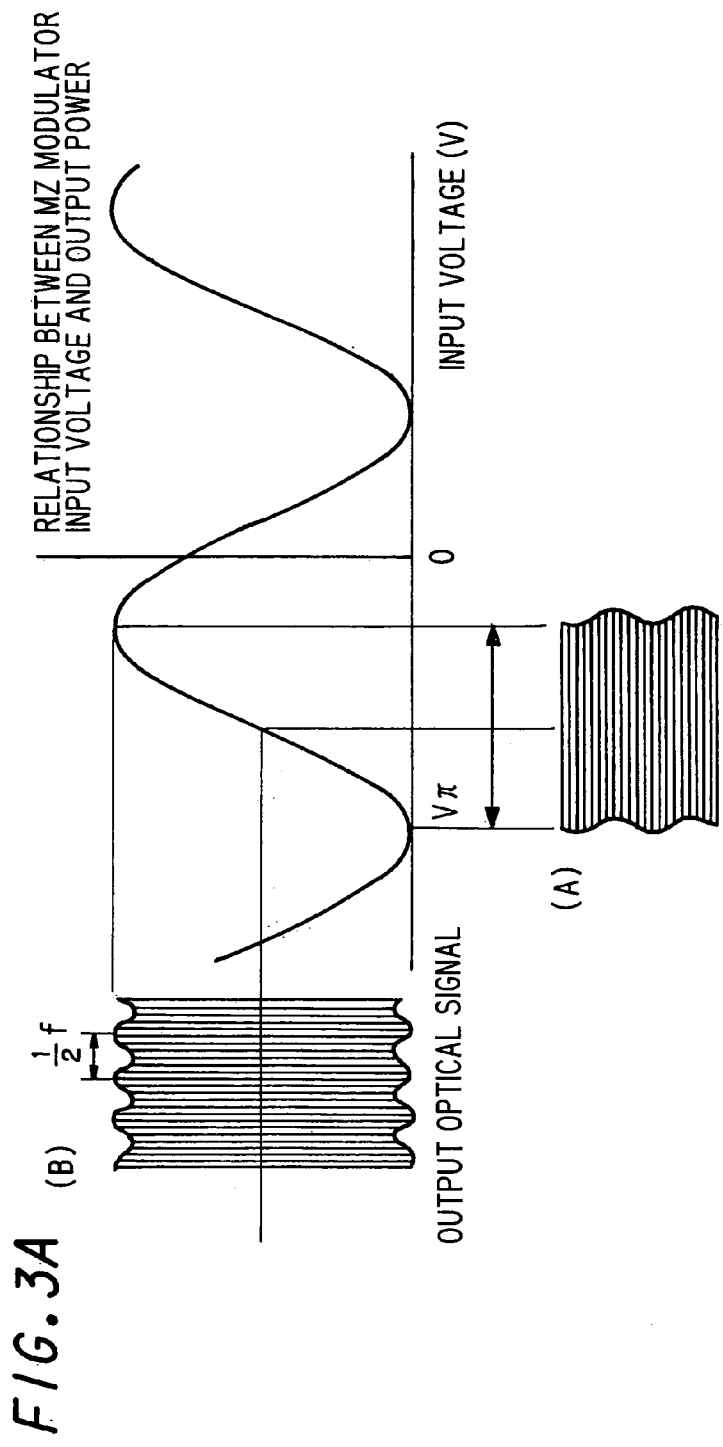

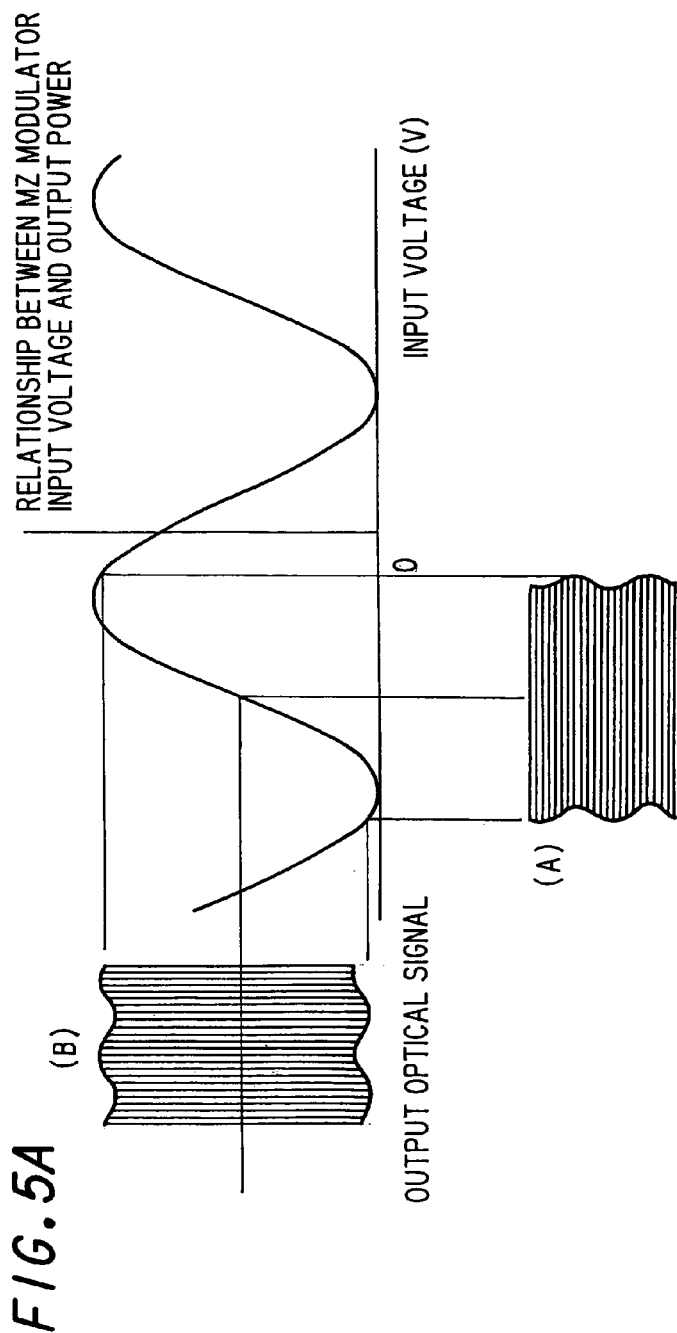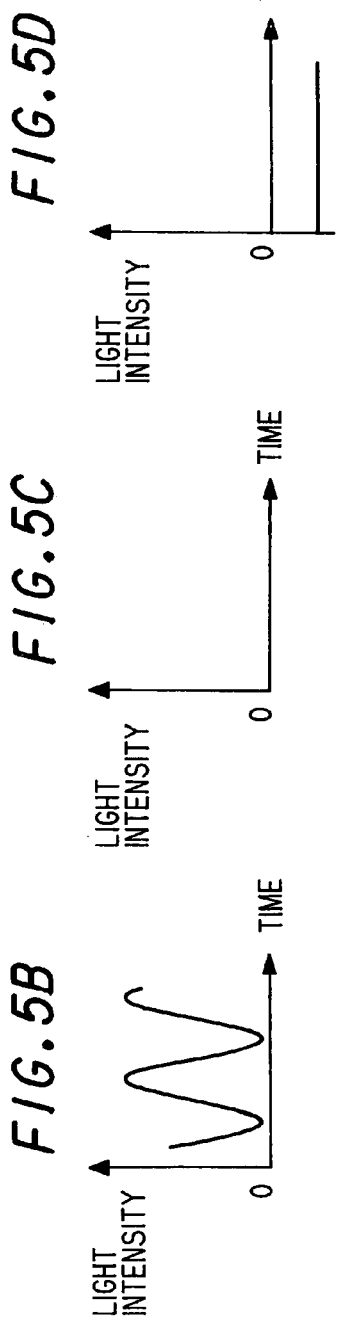
FIG.5A
FIG.5B
FIG.5C
FIG.5D

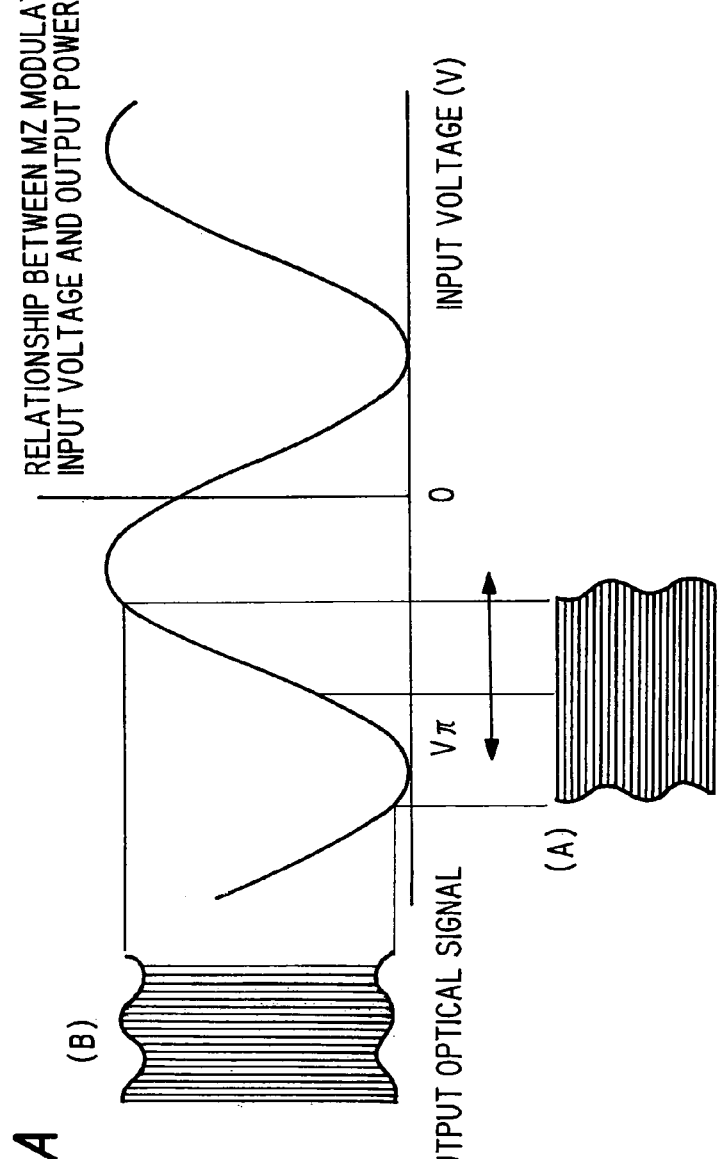
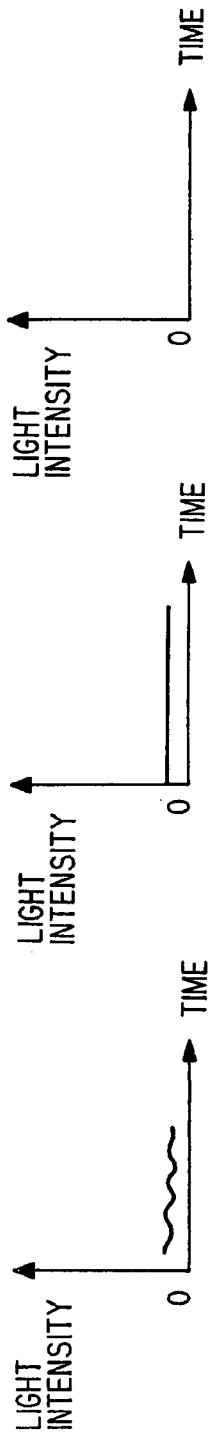
FIG. 6A
FIG. 6B
FIG. 6C
FIG. 6D

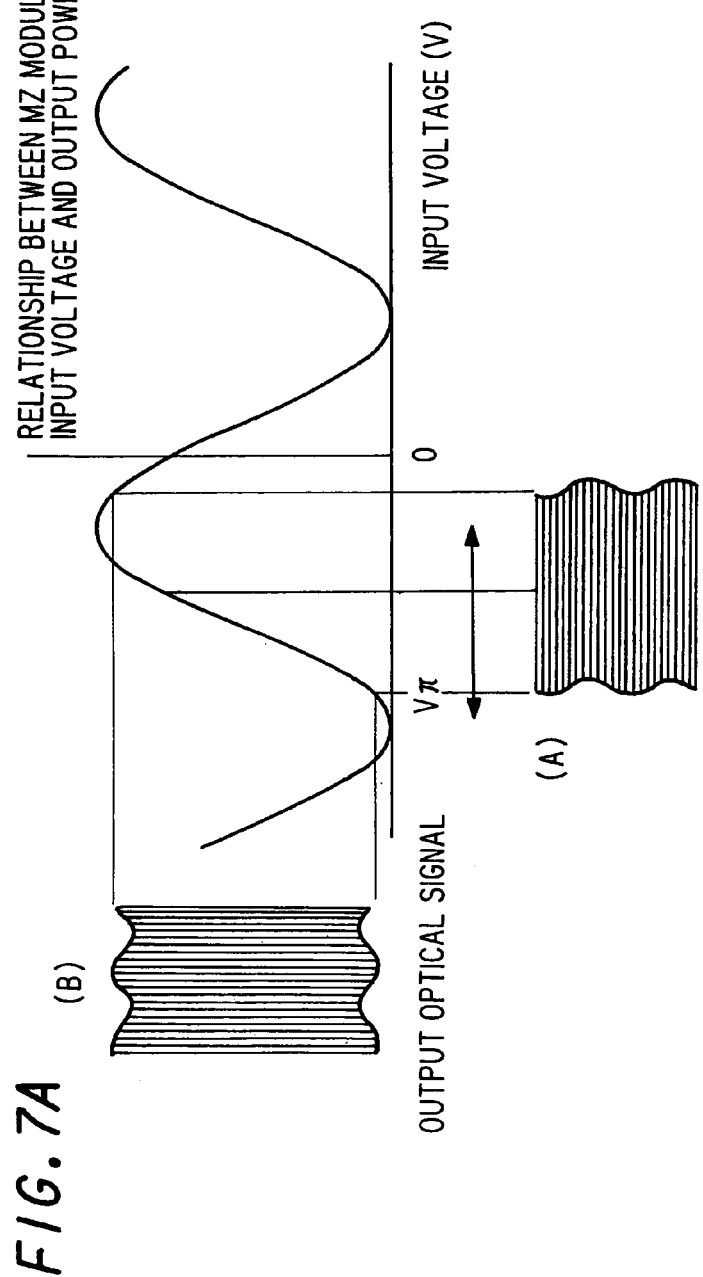
FIG. 7A
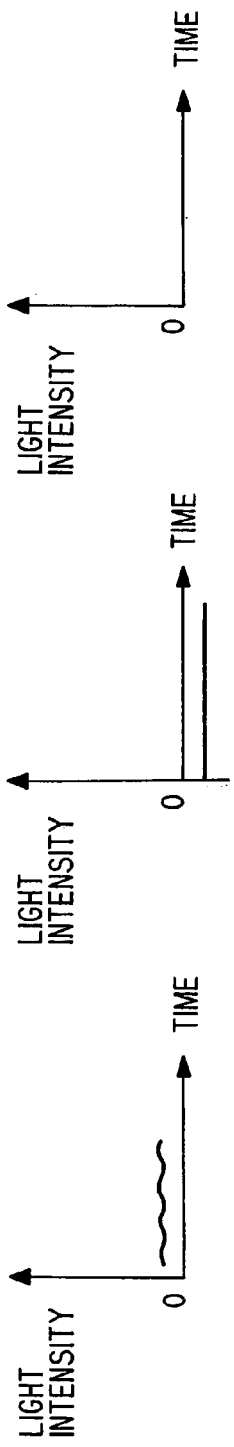
FIG. 7B
FIG. 7C
FIG. 7D

SIGNAL CONVERTER FOR CONVERTING DIGITAL INPUT SIGNAL TO OPTICAL MODULATION SIGNAL

The present application is based on Japanese patent application No. 2003-163661, the entire contents of which are incorporated herein by reference.

BACKGROUND OF THE INVENTION

1. Field of the Invention

The present invention relates to a signal converter for converting digital input signals to optical modulation signals to output the converted signals, and particularly to a signal converter wherein amplitude control and bias control are simplified.

2. Description of the Related Art

A well-known optical modulator (for example, an LN modulator) is used as a means for optical modulation in a signal converter in which electrical digital signals are converted to optical modulation signals. This type of an optical modulator applies intensity modulation to continuous light having constant intensity. There are a signal electric power proportional to digital input signals and a bias electric power composed of direct current, as an electric power for intensity modulation to be applied to the continuous light. Such signal electric power and bias electric power must be appropriate values for optical modulation signals to be linear with respect to digital input signals without signal distortion.

FIG. 1 shows a conventional signal converter including a circuit for obtaining suitable values of signal electric power and bias electric power, respectively. Namely, the signal converter of FIG. 1 includes a light source 1 for emitting a continuous light of a constant intensity, an optical modulator 2, a driver 3 for amplifying a digital input signal to supply a signal electric power, an oscillator 4 for generating a pilot signal of a frequency f, a DC voltage source 5 for generating a DC voltage in response to feedback of an amplitude monitor signal from an output (or an amplitude monitor terminal) of the driver 3, an adder 6 for superimposing the DC voltage on the pilot signal to supply an output signal to an amplitude control terminal of the driver 3, a splitter 7 for providing a part of optical modulation signals to be output from the optical modulator 2, a monitor photodiode (monitor PD) 8 for receiving a part of the optical modulation signals, a monitor amplifier 9 for amplifying a received electric power of the monitor PD 8 to obtain a monitor signal, a mixer 10 for multiplying the monitor signal by the pilot signal, a low pass filter 11 for removing a high-frequency component (AC component) from the multiplied signal to provide a low-frequency component (DC component) as a monitor phase signal, a differential amplifier 12 for controlling a bias electric power in such that the monitor phase signal reaches a GND level, the monitor phase signal being input to the differential amplifier 12 wherein the other input is connected to GND, and a modulation electric power applier (bias T) 13 for superimposing the bias electric power output from the differential amplifier 12 on an AC component of the signal electric power output from the driver 3 to apply an output signal to the optical modulator 2.

As shown in FIG. 1, a feedback system 14 for amplitude control is constituted by a loop of the driver 3, the DC voltage source 5, and the adder 6. Furthermore, a monitor circuit 15 for receiving a part of optical modulation signals output to provide it as a monitor signal includes the splitter 7, the monitor PD 8, and the monitor amplifier 9. Moreover, a feedback system 16 for bias control is constituted by a loop of the differential amplifier 12, the bias T, the optical modulator 2, the monitor circuit 15, the mixer 10, and the low pass filter 11.

In the signal converter shown in FIG. 1, a pilot signal of a frequency f is input to an amplitude control terminal of the driver 3 amplifying digital input signals, whereby amplitude of a signal electric power to be supplied to the optical modulator 2 is controlled. A DC voltage of the DC voltage source 5 is controlled in such that an amplitude monitor signal of the driver 3 becomes constant in the feedback system 14, whereby a signal electric power is controlled. However, it is necessary for adjusting initially elements contained in the feedback system 14 in order to obtain the optimum amplitude in the optical modulator 2.

To control automatically a bias electric power at the optimum point, a part of optical modulation signals output from the optical modulator 2 is provided by the splitter 7, and it is received by the monitor PD 8. The received electric power is amplified by the monitor amplifier 9 to obtain a monitor signal, the monitor signal is multiplied by a pilot signal in the mixer 10, and a monitor phase signal being a DC component is provided by the low pass filter 11. When the monitor phase signal is input to the differential amplifier 12 in which the other input is connected to GND, a bias electric power is automatically controlled in such that the monitor phase signal reaches the GND level (Japanese patent No. 2642499).

In a conventional signal converter, it is required to adjust initially elements contained in the feedback system 14 in order to obtain the optimum amplitude in the optical modulator 2. The initial adjustment is carried out by such a manner that operations for exchanging parts of the feedback system 14 or operations for adjusting finger grips of the parts of the feedback system 14 are repeated while measuring optical outputs of the signal converter by means of an external measuring device. As a result, such initial adjustment decreases mass productivity of signal converter, besides it is an obstruction for reducing a cost therefor.

SUMMARY OF THE INVENTION

Accordingly, it is an object of the present invention to solve the above-described problems, and to provide a signal converter wherein amplitude control and bias control can be simplified.

In order to achieve the above-described object, a signal converter for converting a digital input signal to an optical modulation signal according to the present invention comprises a Mach-Zehnder type optical modulator to be supplied with the digital input signals controlled in amplitude, and a bias signal for providing the optical modulation signal, a pilot signal-superimposing circuit for superimposing a pilot signal of a frequency on a bias control signal, a monitor circuit for providing a monitor signal by receiving a part of the optical modulation signal supplied from the optical modulator, a first feedback system for providing an amplitude control signal to control an amplitude of the digital input signal in accordance with a frequency deviation signal obtained from the monitor signal, and a second feedback system for providing the bias control signal to control the bias signal in accordance with a multiplying frequency deviation signal obtained from the monitor signal.

In the signal converter according to the invention, the first feedback system comprises a first mixer for multiplying the pilot signal and the monitor signal, a first low pass filter for providing the frequency deviation signal based on a low frequency component obtained from an output of the first mixer, and a first differential amplifier for providing the amplitude control signal in accordance with a difference between an output of the first low pass filter and a first reference signal.

In the signal converter according to the invention, the second feedback system comprises a first oscillator for generating a multiplying frequency corresponding to a multiplication of the frequency of the pilot signal, a second mixer for multiplying an output of the first oscillator and the monitor signal, a second low pass filter for providing the multiplying frequency deviation signal based on a low frequency component obtained from an output of the second mixer, and a second differential amplifier for providing the bias control signal in accordance with a difference between an output of the second low pass filter and a second reference signal.

In the signal converter according to the invention, the second feedback system comprises a second oscillator for generating the frequency of the pilot signal, a band pass filter for providing a harmonic wave contained in the pilot signal, a third mixer for multiplying the harmonic wave and the monitor signal, a third low pass filter for providing a multiplying frequency deviation signal based on a low frequency component obtained from an output of the third mixer, and a third differential amplifier for providing the bias control signal in accordance with a difference between an output of the third low pass filter and a third reference signal.

In the signal converter according to the invention, the first oscillator generates a twofold frequency of the frequency of the pilot signal.

BRIEF DESCRIPTION OF THE DRAWINGS

The present invention will be explained in more detail in conjunction with appended drawings, wherein:

FIGS. 3A through 3D are graphical representations showing signal waveforms in respective sections (A) through (E) in the signal converter shown in FIG. 2;

FIGS. 5A through 5D are graphical representations showing signal waveforms in respective sections (A) through (E) in the signal converter shown in FIG. 2;

FIGS. 6A through 6D are graphical representations showing signal waveforms in respective sections (A) through (E) in the signal converter shown in FIG. 2;

FIGS. 7A through 7D are graphical representations showing signal waveforms in respective sections (A) through (E) in the signal converter shown in FIG. 2;

DESCRIPTION OF THE PREFERRED EMBODIMENTS

A preferred embodiment of the present invention will be described in detail hereinafter by referring to the accompanying drawings.

Figure 1:
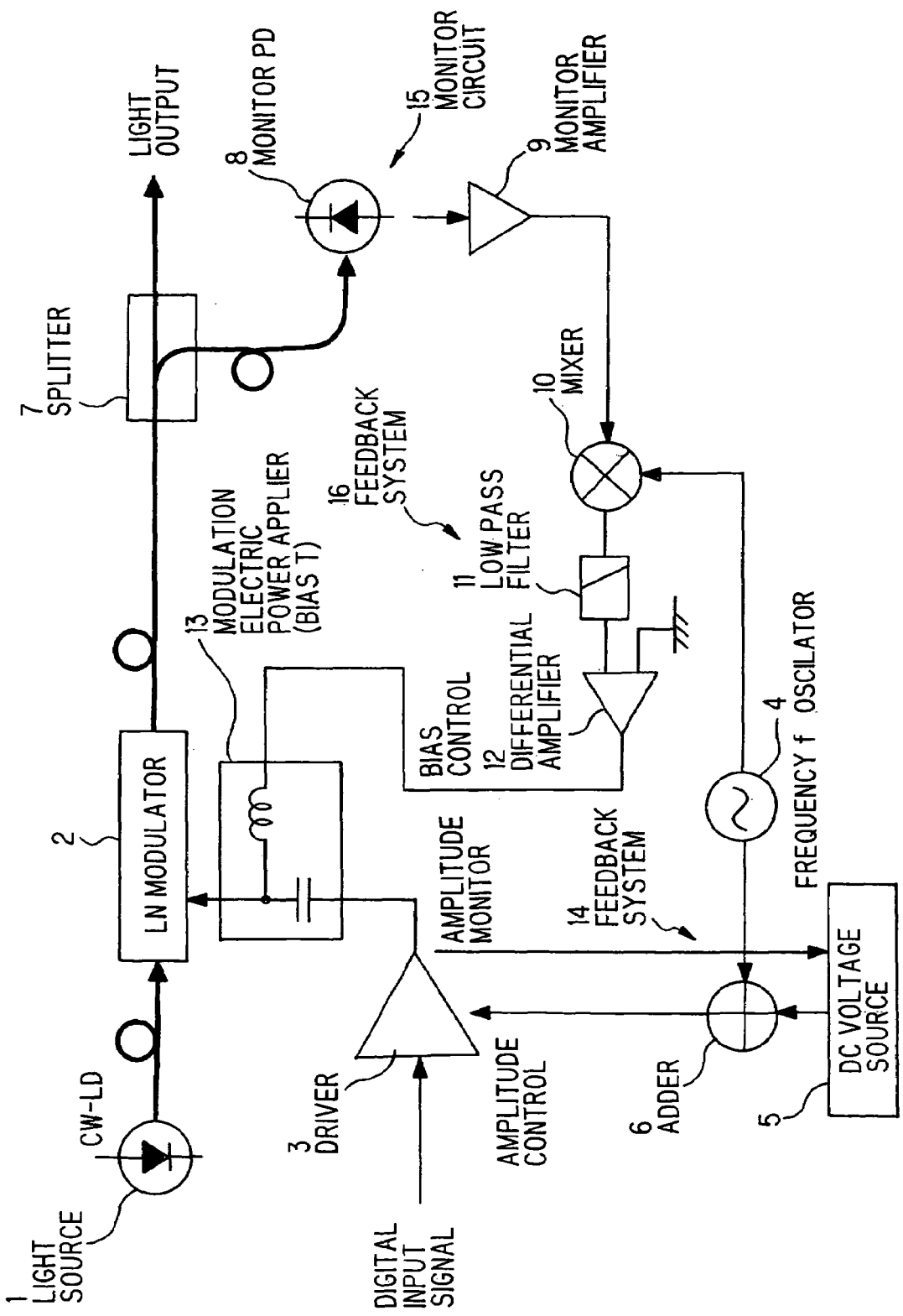
FIG. 1 is a circuit diagram showing a conventional signal converter.
Figure 2:
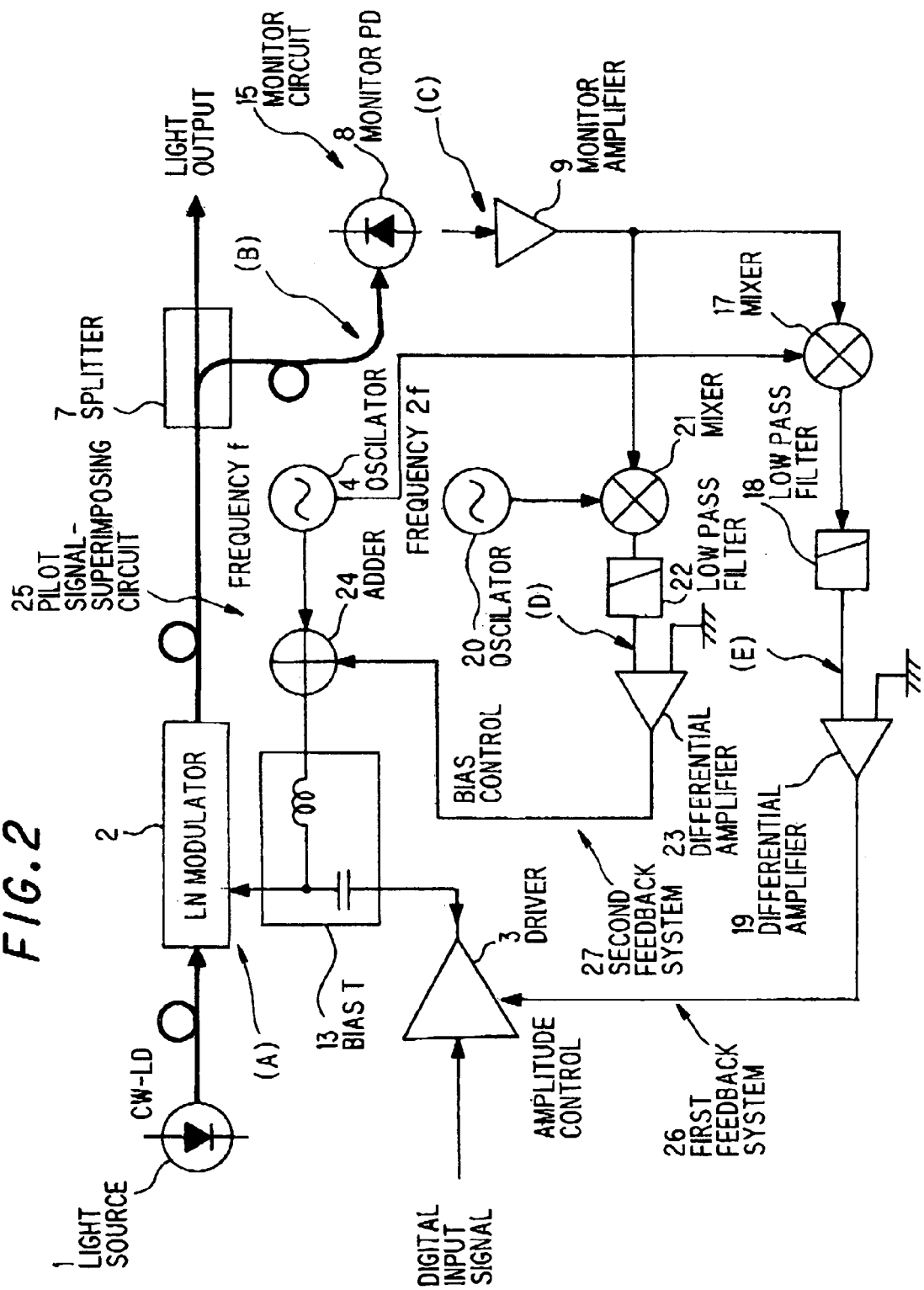
FIG. 2 is a circuit diagram showing a signal converter according to an embodiment of the present invention.

As shown in FIG. 2, a signal converter according to the present invention comprises a light source 1 for emitting continuous light having constant intensity, a Mach-Zehnder type optical modulator 2, a driver 3 for amplifying digital input signals to supply a signal power, an oscillator 4 for generating a pilot signal having a frequency f, a splitter 7 for providing a part of optical modulation signal output from the Mach-Zehnder type optical modulator 2, a monitor photodiode (monitor PD) 8 for receiving a part of the optical modulation signal, a monitor amplifier 9 for amplifying an electric power received by the monitor PD 8 to obtain a monitor signal, a mixer 17 for multiplying the monitor signal by the pilot signal, a low pass filter 18 for removing a high-frequency component (AC component) from the multiplied signal to provide a low-frequency component (DC component) as a deviation signal as to the frequency f (hereinafter referred to as "deviation signal"), a differential amplifier 19 for controlling an output to an amplitude control terminal of the driver 3 in such that the f deviation signal reaches a GND level, the f deviation signal being applied to the differential amplifier 19 as either of inputs wherein the other input is connected to GND, an oscillator 20 for generating a signal for interior reference of a twofold frequency 2f, a mixer 21 for multiplying the monitor signal by the interior reference signal, a low pass filter 22 for removing a high-frequency component (AC component) from the multiplied signal to provide a low-frequency component (DC component) as a secondary monitor phase signal, a differential amplifier 23 for controlling a bias electric power in such that the 2f deviation signal reaches a GND level, the 2f deviation signal being input to the differential amplifier 23 as either of inputs wherein the other input is connected to GND, an adder 24 for adding a pilot signal of frequency f from the oscillator 4 to an output of the differential amplifier 23, and a modulation electric power applier (bias T) 13 for superimposing a bias electric power containing the pilot signal on an AC component of a signal electric power output from the driver 3.

As shown in FIG. 2, the signal converter of the invention includes a pilot signal superimposition circuit 25 for superimposing a pilot signal of a frequency f on a bias electric power. A monitor circuit 15 for receiving a part of an optical modulation signal output to provide the signal as a monitor signal includes the splitter 7, the monitor PD 8, and the monitor amplifier 9. Moreover, a first feedback system 26 for providing a frequency f-component from a monitor signal to feed back it for controlling an amplitude of a digital input signal includes a loop including the differential amplifier 23, the driver 3, a bias T 13, the optical modulator 2, the monitor circuit 15, the mixer 17, and the low pass filter 18. Furthermore, a second feedback system 27 for providing a twofold frequency 2f-component from a monitor signal to feed back it to a bias electric power includes a loop including the differential amplifier 23, the pilot signal superimposition circuit 25, the bias T 13, the Mach-Zehnder type optical modulator 2, the monitor circuit 15, the mixer 21, and the low pass filter 22.

In the signal converter shown in FIG. 2 according to the present invention, a bias point (an intermediate point in between the upper and the lower peaks in digital signals) of an optical modulation signal output from the Mach-Zehnder type optical modulator 2 is varied by supplying a pilot signal of frequency f which is allowed to contain in a bias electric power to the optical modulator 2. A part of the optical modulation signal is divided by the splitter 7 to be received by the monitor PD 8. A monitor signal obtained by amplifying the received electric power in the monitor amplifier 9 is multiplied by the pilot signal of frequency f in the mixer 17, and an f deviation signal being a DC component is provided by means of the low pass filter 18. When the f deviation signal is input to the differential amplifier 19 wherein the other input is connected to GND, output amplitude, i.e. a signal electric power is controlled automatically in such that the f deviation signal reaches GND level.

On one hand, a monitor signal is multiplied by an interior reference signal of twofold frequency 2f in the mixer 21, and a 2f deviation signal being a DC component is provided by the low pass filter 22. When the 2f deviation signal is input to the differential amplifier 23 wherein the other input is connected to GND, a bias electric power (without containing a pilot signal) is controlled automatically in such that the 2f deviation signal reaches GND level, whereby its bias point becomes the optimum point.

FIGS. 3A to 3D, 4A to 4D, 5A to 5D, 6A to 6D, and 7A to 7D are graphical representations showing input-output characteristic waveforms representing relationships between input voltages and output powers in the optical modulator 2 being an LN modulator (MZ modulator), respectively, together with signal waveforms in respective sections (A) through (E) in the signal converter shown in FIG. 2 wherein each section (A) shows a waveform at an input end of modulation electric power of the optical modulator 2, each section (B) shows an optical waveform at which a part of an optical modulation signal is provided, each section (C) shows a waveform of a received electric power in the monitor PD 8, each section (D) shows a waveform of 2f deviation signal to be input to the differential amplifier 23, and each section (E) shows a waveform of f deviation signal to be input to the differential amplifier 19. In the respective waveforms of the above figures, each abscissa indicates time, and each ordinate indicates voltage or light intensity.

FIG. 3A shows a case where output amplitude of the driver 3 is the optimum amplitude $V_\pi$ and a bias point is in the optimum point. As shown in a representation (A) of FIG. 3A, a modulation electric power has the same phase with respect to a waveform enveloping the upper peak in digital signal and a waveform enveloping the lower peak in digital signal to each other. This is because a bias electric power containing a pilot signal is superimposed on an AC component of a signal electric power from the driver 3. As shown in a representation (B) of FIG. 3A, optical modulation signals appear with a substantially reverse phase with respect to a waveform enveloping the upper peak in digital signal (cycle 1/2f) and a waveform enveloping the lower peak in digital signal (cycle 1/2f). Since response of the monitor PD 8 is slow, a digital signal component being high frequency is substantially cut off, so that a signal being an average waveform of the representation (B) in FIG. 3A is output. In this case, the upper peak and the lower peak vary inversely at substantially the same time in such that when the upper peak is high, the lower peak becomes low in the representation (B) of FIG. 3A. As a result, a waveform of a received electric power of the monitor PD 8 is substantially direct current as shown in FIG. 3B. Thus, a 2f deviation signal multiplied by an interior reference signal of a twofold frequency 2f in the mixer 21, and then a high-frequency component of which is cut off with the low pass filter 22 becomes zero-potential direct current as shown in FIG. 3C.

Furthermore, an f deviation signal multiplied by a pilot signal of frequency f in the mixer 17, and then a high-frequency component of which is cut off with the low pass filter 18 becomes zero-potential direct current as shown in FIG. 3D.

The reason why a waveform shown in the representation (B) of FIG. 3A changes with 1/2f cycle is in that output amplitude of the driver 3 is the optimum amplitude $V_\pi$, and a bias point is the optimum point. More specifically, voltage changes of a digital input signal from the modulation electric power applier 13 shown in the representation (A) of FIG. 3A become horizontal changes on its input voltage axis at an inflection point in the input-output characteristic waveform of the optical modulator 2. Hence, output changes of the optical modulator 2 are twice larger changes of a pilot signal.

Figure 4A:
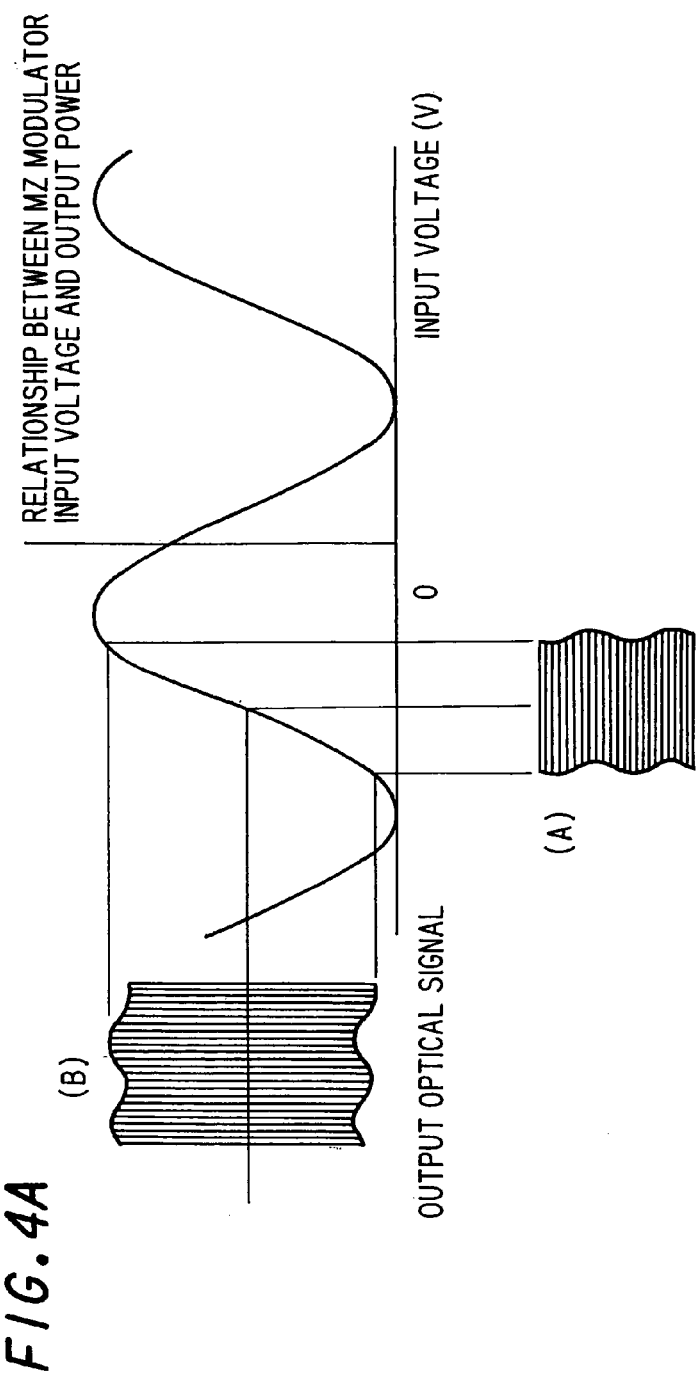
FIGS. 4A through 4D are graphical representations showing signal waveforms in respective sections (A) through (E) in the signal converter shown in FIG. 2.
Figure 4D:
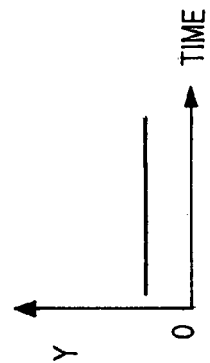
Figures 4B, 4C:
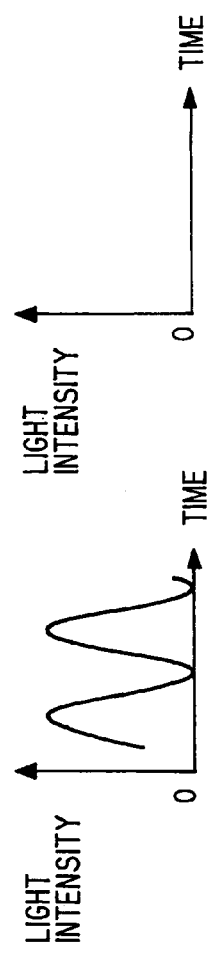

FIG. 4A shows a case where output amplitude of the driver 3 is less than the optimum amplitude $V_\pi$, and a bias point is in the optimum point. As shown in a representation (B) of FIG. 4A, optical modulation signals appear with substantially the same phase to each other with respect to a waveform enveloping the upper peak in digital signal (cycle 1/f) and a waveform enveloping the lower peak in digital signal (cycle 1/f). More specifically, the upper and the lower peaks change almost simultaneously with each other as to time and changes in decrease and increase in the same directions in such that when the upper peak is high, the lower peak is also high. Accordingly, a waveform of received electric power of the monitor PD 8 changes with a frequency f as shown in FIG. 4B. A waveform of FIG. 4C is zero-potential direct current, while a waveform of FIG. 4D is higher direct current than zero-potential.

The reason why the waveform shown in FIG. 4C is zero-potential direct current is due to the following mechanism. An output of FIG. 4B is multiplied by an interior reference signal of twofold frequency 2f in the mixer 21, so that an output of the mixer 21 is represented by the following formula:

$$\sin(2\pi ft)\cdot\sin(2\pi 2ft) = \{-\cos(6\pi ft) + \cos(2\pi ft)\}/2$$

This output belongs to high frequency, so that it is cut off by the low pass filter 22 to be zero-potential direct current.

The reason why the waveform of FIG. 4D is higher direct current than zero-potential is due to the following mechanism.

Since the output shown in FIG. 4B is multiplied by a pilot signal of frequency f in the mixer 17, the output of the mixer 17 is represented by the following formula:

$$\sin(2\pi ft)\cdot\sin(2\pi 2ft) = \{-\cos(4\pi ft) + \cos(0)\}/2$$

When a high-frequency component of the output is cut off, only the right-hand side cos (0)/2 component remains.

FIG. 5A shows a case where output amplitude of the driver 3 is higher than the optimum amplitude $V_\pi$, and a bias point is in the optimum point. As shown in a representation (B) of FIG. 5A, optical modulation signals appear with almost the same phase to each other with respect to a waveform enveloping the upper peak (cycle 1/f) in digital signal and a waveform enveloping the lower peak (cycle 1/f) in digital signal. More specifically, the upper and the lower peaks change almost simultaneously to each other in respect of time in the same directions in such that when the upper peak is high, the lower peak is also high. Accordingly, a waveform of received electric power of the monitor PD 8 changes with a frequency f as shown in FIG. 5B. However, the waveform of FIG. 5B is a reversed phase with respect to that of FIG. 4B. In this case, the waveform of FIG. 5C is zero-potential direct current, while the waveform of FIG. 5D is smaller direct current than zero-potential.

FIG. 6A shows a case where output amplitude of the driver 3 is the optimum amplitude $V_\pi$, and a bias point is lower than the optimum point. As shown in a representation (B) of FIG. 6A, there is a condition wherein signals of frequencies f and 2f ride on optical modulation signal. Concerning the frequency f, a waveform enveloping the upper peak is in substantially reverse phase with respect to a waveform enveloping the lower peak. Under the circumstances, when optical modulation signals are averaged, signal of frequency f disappears. Namely, a waveform of a received electric power in the monitor PD 8 has a frequency 2f as shown in FIG. 6B. Accordingly, the waveform of FIG. 6C is larger direct current than zero-potential, while the waveform of FIG. 6D is zero-potential direct current.

The reason why a component of frequency 2f appears on the waveform of FIG. 6B is in that modulation is effected by a nonlinear portions, i.e. peak and trough portions of input-output characteristic waveforms in the optical modulator 2, so that higher-order frequency components are superimposed on one another.

FIG. 7A shows a case where output amplitude of the driver 3 is the optimum amplitude $V_\pi$, and a bias point is higher than the optimum point. As shown in a representation (B) of FIG. 7A, there is a condition wherein signals of frequencies f and 2f ride on optical modulation signal. Concerning the frequency f, a waveform enveloping the upper peak is in substantially reverse phase with respect to a waveform enveloping the lower peak. Under the circumstances, when optical modulation signals are averaged, signal of frequency f disappears. Namely, a waveform of a received electric power in the monitor PD 8 is a frequency 2f as shown in FIG. 7B. However, the waveform of FIG. 7B is a reversed phase with respect to that of FIG. 6B. Accordingly, the waveform of FIG. 7C is smaller direct current than zero-potential, while the waveform of FIG. 7D is zero-potential direct current.

In any of FIGS. 4C to 7C and FIGS. 4D to 7D, inclusive, the waveforms are allowed to be close to zero-potential as much as possible by means of feedback, respectively. Accordingly, it is difficult to observe actually these waveforms, but these situations are emphasized for explaining a principle of operation in the circuits. As a result of the feedback, deviations are automatically adjusted in either the case where output amplitude of the driver 3 is deviated from the optimum amplitude $V_\pi$, or the case where a bias point is deviated from the optimum point, so that the output amplitude of the driver 3 becomes the optimum $V_\pi$, while the bias point becomes the optimum point as shown in FIG. 3A.

In the following, other embodiments of the present invention will be described.

Figure 8:
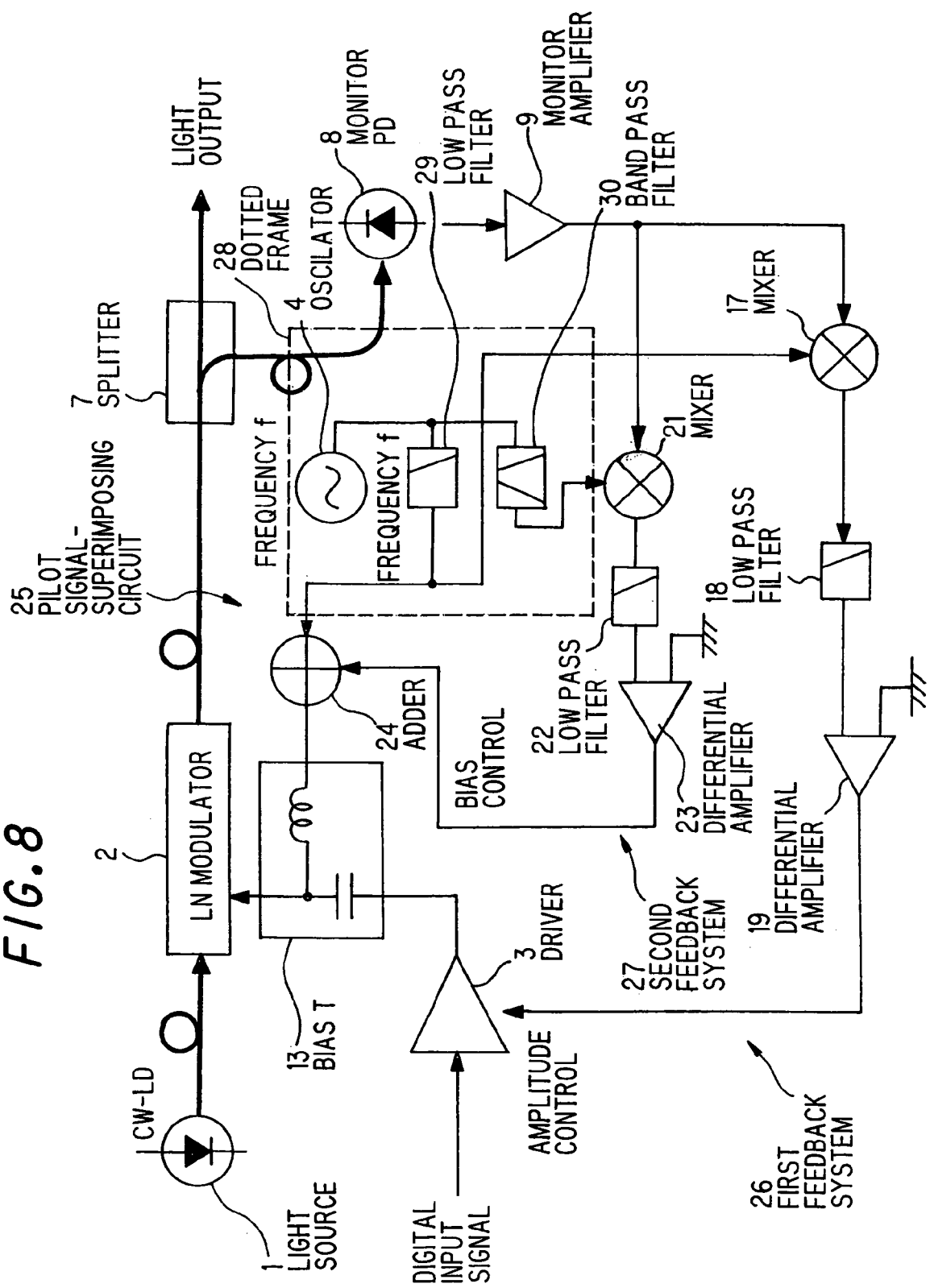
FIG. 8 is a circuit diagram showing a signal converter according to another embodiment of the present invention.

A signal converter shown in FIG. 8 is the one wherein only a part surrounded by a dotted frame 28 is modified with respect to the signal converter shown in FIG. 2. Explanation will be made only the interior of the dotted frame 28 which contains an oscillator 4 for generating principally signals each having a frequency f, a low pass filter 29 for providing signals of the frequency f from an output of the oscillator 4, and a band pass filter 30 for providing second harmonics of signals each having a frequency 2f from an output of the oscillator 4. The output from the oscillator 4 contains somewhat harmonics other than signals of the frequency f. Thus, only the signals having a frequency f-component are provided by the low pass filter 29 to apply to the adder 24 as a pilot signal, and at the same time to apply the signals to the mixer 17 as a reference signal for converting the frequency f-component in monitor signals to DC voltage. On one hand, interior reference signals of a twofold frequency 2f is provided by the band pass filter 30 to apply the mixer 21 as a reference signal for converting the frequency 2f-component in the monitor signals to DC voltage.

Figure 9:
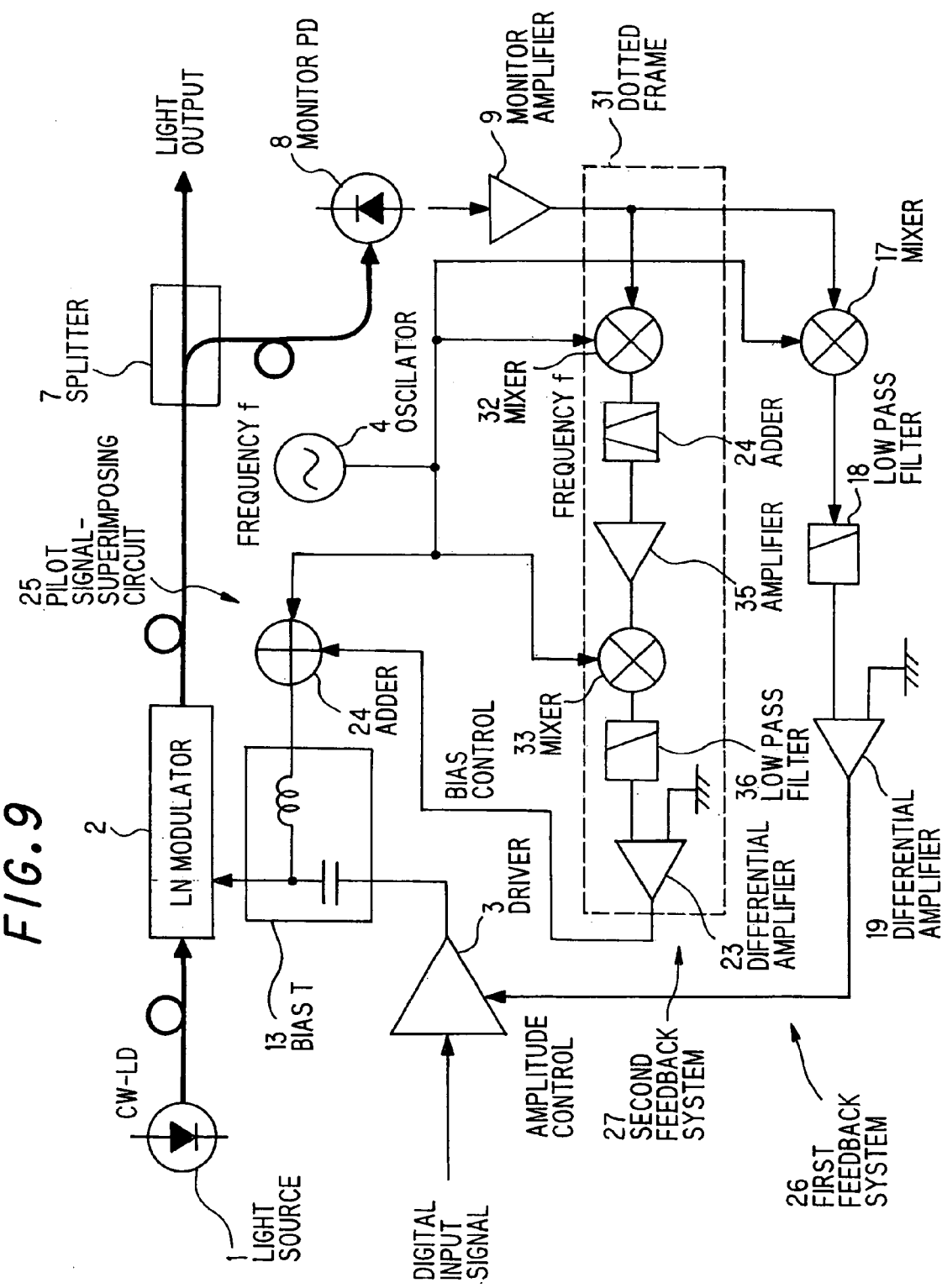
FIG. 9 is a circuit diagram showing a signal converter according to a further embodiment of the present invention.

A signal converter shown in FIG. 9 is the one wherein only a part surrounded by a dotted frame 31 is modified with respect to the signal converter shown in FIG. 2. In the present embodiment, an output of the oscillator 4 is divided into four parts, one of which is applied to the adder 24 as a pilot signal, another is applied to the mixer 17 as a reference signal for converting a frequency f-component in monitor signals to DC voltage, and the remaining two parts are applied to a mixer 32 and a mixer 33 in the dotted frame 31 as two reference signals each for converting frequency 2f-component in monitor signals to DC voltage. The monitor signals are input to the mixer 32, the frequency 2f-component of the monitor signals is converted by the mixer 32 to signals of frequency f, the signals converted are extracted by the band pass filter 34 of frequency f, and the extracted signals are amplified by the amplifier 35. The signals thus amplified are converted to DC voltage by the mixer 33, and it is extracted by the low pass filter 36.

Figure 10:
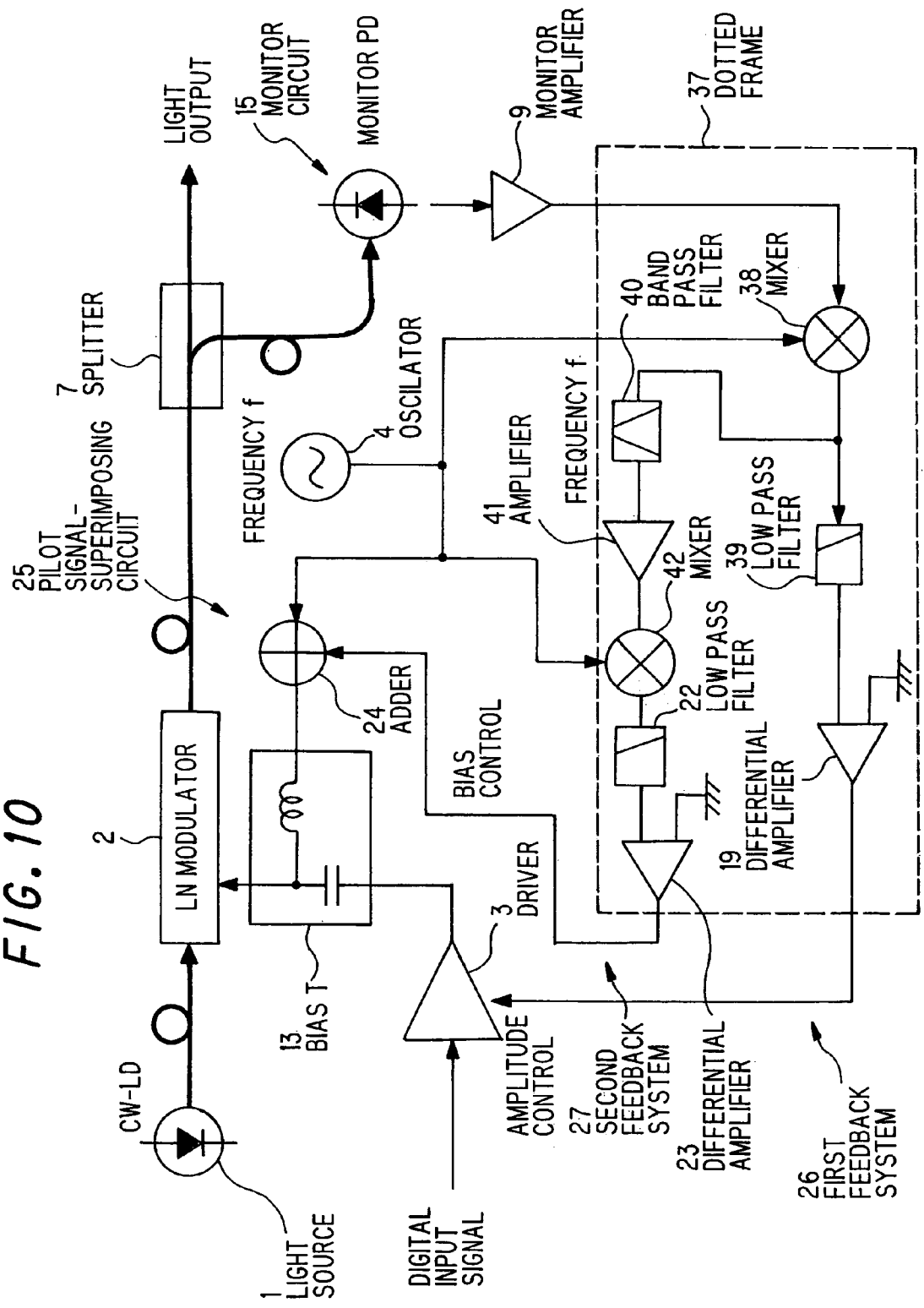
FIG. 10 is a circuit diagram showing a signal converter according to a still further embodiment of the present invention.

A signal converter shown in FIG. 10 is the one wherein only a part surrounded by a dotted frame 37 is modified with respect to the signal converter shown in FIG. 2. In the present embodiment, an output of the oscillator 4 is divided into three parts, one of which is applied to the adder 24 as a pilot signal, another is applied to a mixer 38 as both reference signals served for converting a frequency f-component in monitor signals to DC voltage and for converting a frequency 2f-component in the monitor signals to signals of the frequency f-component. An output of the mixer 38 is divided into two parts, one of the output from the mixer 38 is input to a low pass filter 39 for providing DC voltage, and the other is input to a band pass filter 40 for providing the frequency f-component. The DC voltage provided from the low pass filter 39 is input to the differential amplifier 19 as in the case of FIG. 2.

The frequency f-component provided by the band pass filter 40 is amplified by the amplifier 41, and then the frequency f-component thus amplified is applied to a mixer together with one residual output of the above-described three divided outputs in the oscillator 4. The operations in the low pass filter 22 on and after are the same with those of FIG. 2.

According to the signal converter of the present invention, such an advantage that amplitude control and bias control can be simplified in the signal converter is obtained.

It will be appreciated by those of ordinary skill in the art that the present invention can be embodied in other specific forms without departing from the spirit or essential characteristics thereof.

The presently disclosed embodiments are therefore considered in all respects to-be illustrative and not restrictive. The scope of the invention is indicated by the appended claims rather than the foregoing description, and all changes that come within the meaning and range of equivalents thereof are intended to be embraced therein.

What is claimed is:

1. A signal converter for converting a digital input signal to an optical modulation signal, comprising:
    a Mach-Zehnder type optical modulator to be supplied with the digital input signals controlled in amplitude, and a bias signal for providing the optical modulation signal;

a pilot signal-superimposing circuit for superimposing a pilot signal of a frequency on a bias control signal;

a monitor circuit for providing a monitor signal by receiving a part of the optical modulation signal supplied from the optical modulator;

a first feedback system for providing an amplitude control signal to control an amplitude of the digital input signal in accordance with a frequency deviation signal obtained from the monitor signal; and a second feedback system for providing the bias control signal to control the bias signal in accordance with a multiplying frequency deviation signal obtained from the monitor signal, wherein:

the first feedback system comprises a first mixer for multiplying the pilot signal and the monitor signal; a first low pass filter for providing the frequency deviation signal based on a low frequency component obtained from an output of the first mixer; and a first differential amplifier for providing the amplitude control signal in accordance with a difference between an output of the first low pass filter and a first reference signal.

2. The signal converter as defined in claim 1, wherein:

the second feedback system comprises a first oscillator for generating a multiplying frequency corresponding to a multiplication of the frequency of the pilot signal; a second mixer for multiplying an output of the first oscillator and the monitor signal; a second low pass filter for providing the multiplying frequency deviation signal based on a low frequency component obtained from an output of the second mixer; and a second differential amplifier for providing the bias control signal in accordance with a difference between an output of the second low pass filter and a second reference signal.

3. The signal converter as defined in claim 2, wherein:

the first oscillator generates a twofold frequency of the frequency of the pilot signal.

4. The signal converter as defined in claim 1, wherein:

the second feedback system comprises a second oscillator for generating the frequency of the pilot signal; a band pass filter for providing a harmonic wave contained in the pilot signal; a third mixer for multiplying the harmonic wave and the monitor signal; a third low pass filter for providing a multiplying frequency deviation signal based on a low frequency component obtained from an output of the third mixer; and a third differential amplifier for providing the bias control signal in accordance with a difference between an output of the third low pass filter and a third reference signal.

5. A signal converter for converting a digital input signal to an optical modulation signal, comprising:

a Mach-Zehnder type optical modulator to be supplied with the digital input signals controlled in amplitude, and a bias signal for providing the optical modulation signal;

a pilot signal-superimposing circuit for superimposing a pilot signal of a frequency on a bias control signal;

a monitor circuit for providing a monitor signal by receiving a part of the optical modulation signal supplied from the optical modulator;

a first feedback system for providing an amplitude control signal to control an amplitude of the digital input signal in accordance with a frequency deviation signal obtained from the monitor signal; and a second feedback system for providing the bias control signal to control the bias signal in accordance with a multiplying frequency deviation signal obtained from the monitor signal, wherein:

the second feedback system comprises a first oscillator for generating a multiplying frequency corresponding to a multiplication of the frequency of the pilot signal; a second mixer for multiplying an output of the first oscillator and the monitor signal; a second low pass filter for providing the multiplying frequency deviation signal based on a low frequency component obtained from an output of the second mixer; and a second differential amplifier for providing the bias control signal in accordance with a difference between an output of the second low pass filter and a second reference signal.

6. The signal converter as defined in claim 5, wherein:

the first oscillator generates a twofold frequency of the frequency of the pilot signal.

7. A signal converter for converting a digital input signal to an optical modulation signal, comprising:

a Mach-Zehnder type optical modulator to be supplied with the digital input signals controlled in amplitude, and a bias signal for providing the optical modulation signal;

a pilot signal-superimposing circuit for superimposing a pilot signal of a frequency on a bias control signal;

a monitor circuit for providing a monitor signal by receiving a part of the optical modulation signal supplied from the optical modulator;

a first feedback system for providing an amplitude control signal to control an amplitude of the digital input signal in accordance with a frequency deviation signal obtained from the monitor signal; and a second feedback system for providing the bias control signal to control the bias signal in accordance with a multiplying frequency deviation signal obtained from the monitor signal, wherein:

the second feedback system comprises a second oscillator for generating the frequency of the pilot signal; a band pass filter for providing a harmonic wave contained in the pilot signal; a third mixer for multiplying the harmonic wave and the monitor signal; a third low pass filter for providing a multiplying frequency deviation signal based on a low frequency component obtained from an output of the third mixer; and a third differential amplifier for providing the bias control signal in accordance with a difference between an output of the third low pass filter and a third reference signal.

8. A signal converter for converting a digital input signal to an optical modulation signal, comprising:

a Mach-Zehnder type optical modulator to be supplied with the digital input signals controlled in amplitude, and a bias signal for providing the optical modulation signal;

a pilot signal-superimposing circuit for superimposing a pilot signal of a frequency on a bias control signal;

a monitor circuit for providing a monitor signal by receiving a part of the optical modulation signal supplied from the optical modulator;

a first feedback system for providing an amplitude control signal to control an amplitude of the digital input signal in accordance with a frequency deviation signal obtained from the monitor signal; and a second feedback system for providing the bias control signal to control the bias signal in accordance with a multiplying frequency deviation signal obtained from the monitor signal, wherein the second feedback system comprises a first oscillator for generating a twofold frequency of the frequency of the pilot signal.

9. The signal converter as defined in claim 8, wherein the second feedback system further comprises a second oscillator for generating the frequency of the pilot signal.

10. A signal converter for converting a digital input signal to an optical modulation signal, comprising:

a Mach-Zehnder type optical modulator to be supplied with the digital input signals controlled in amplitude, and a bias signal for providing the optical modulation signal;

a pilot signal-superimposing circuit for superimposing a pilot signal of a frequency on a bias control signal;

a monitor circuit for providing a monitor signal by receiving a part of the optical modulation signal supplied from the optical modulator;

a first feedback system for providing an amplitude control signal to control an amplitude of the digital input signal in accordance with a frequency deviation signal obtained from the monitor signal; and a second feedback system for providing the bias control signal to control the bias signal in accordance with a multiplying frequency deviation signal obtained from the monitor signal, wherein the second feedback system comprises a second oscillator for generating the frequency of the pilot signal.

11. The signal converter as defined in claim 10, wherein output signals having the twofold frequency of the first oscillator and the frequency of the pilot signal of the second oscillator are respectively input into a bias controller.

12. The signal converter as defined in claim 10, wherein output signals having the twofold frequency of the first oscillator and the frequency of the pilot signal of the second oscillator are respectively input into only a bias controller.

13. The signal converter as defined in claim 10, wherein output signals having the twofold frequency of the first oscillator and the frequency of the pilot signal of the second oscillator are respectively input into a bias controller to eliminate a necessity of providing cosine and sine coupling circuits.

14. A signal converter for converting a digital input signal to an optical modulation signal, comprising:

a Mach-Zehnder type optical modulator to be supplied with the digital input signals controlled in amplitude, and a bias signal for providing the optical modulation signal;

a pilot signal-superimposing circuit for superimposing a pilot signal of a frequency on a bias control signal;

a monitor circuit for providing a monitor signal by receiving a part of the optical modulation signal supplied from the optical modulator;

a first feedback system for providing an amplitude control signal to control an amplitude of the digital input signal in accordance with a frequency deviation signal obtained from the monitor signal; and a second feedback system for providing the bias control signal to control the bias signal in accordance with a multiplying frequency deviation signal obtained from the monitor signal, wherein the second feedback system comprises:

a first oscillator for generating a signal for interior reference of a twofold frequency of the frequency of the pilot signal; and a second oscillator for generating the frequency of the pilot signal.

* * * * *